(12) United States Patent
Bates et al.

(10) Patent No.: US 8,312,434 B2
(45) Date of Patent: Nov. 13, 2012

(54) FINDING THE SOURCE STATEMENT OF THE DEFINITION OF A STORAGE LOCATION

(75) Inventors: Cary L Bates, Rochester, MN (US); William J Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 12/166,751

(22) Filed: Jul. 2, 2008

(65) Prior Publication Data

US 2010/0005249 A1    Jan. 7, 2010

(51) Int. Cl.
G06F 9/44 (2006.01)
(52) U.S. Cl. ........ 717/128; 717/124; 717/125; 717/126; 717/127; 717/129
(58) Field of Classification Search ........................ None
See application file for complete search history.

(56) References Cited

U.S. PATENT DOCUMENTS 6,091,896 A      7/2000  Curreri et al.
6,678,884 B1 *   1/2004  Kesselman et al. ........... 717/129

* cited by examiner

Primary Examiner — Li B Zhen
Assistant Examiner — Lenin Paulino
(74) Attorney, Agent, or Firm — Owen J. Gamon

(57) ABSTRACT

In an embodiment, an identifier of a storage location that is accessed by a program is received. While execution of the program is halted at a halted statement, a first source statement is determined that must have stored to the storage location. The program comprises the halted statement and the first source statement, and the halted statement is different than the first source statement. The first source statement is presented, in response to the determination. In an embodiment, while execution of the program is halted at the halted statement, a second source statement is determined that might have stored to the storage location, and the second source statement is presented.

15 Claims, 10 Drawing Sheets

I/O DEVICE 121

PROGRAM LISTING 200

FIND STATEMENT THAT DEFINES CONTENT AT STORAGE LOCATION: V  210

| STATEMENT NUMBER | STATEMENT | |
|---|---|---|
| 1 | MAIN {} | 205-1 |
| 2 | { | BLOCK |
| 5 | READ I | |
| 10 | IF I = 2 THEN | BLOCK 205-2 |
| 15 | V = V + 1 | 205-3 BLOCK |
| 17 | ELSE | |
| 20 | V = V + 2 | 205-4 |
| 21 | Z = 2 | BLOCK |
| 25 | *P = Q + R | BLOCK 205-5 |
| 30 HALT | IF V = 2 THEN | BLOCK 205-6 |
| 40 | V = I + R | BLOCK 205-7 |
| 45 | IF Q = R THEN | BLOCK 205-8 |
| 46 | GOTO STATEMENT 30 | |
| 50 | } | BLOCK 205-9 |

SOURCE STATEMENTS THAT DEFINE THE CONTENT AT A STORAGE LOCATION 215

| STORAGE LOCATION 260 | CONTENT 255 | STATEMENT (MUST DEFINE) 245 | STATEMENT (MIGHT DEFINE) 250 |
|---|---|---|---|
| V | E426 | 15 | 25 |

FIG. 2

SETS 156

MAYDEF (X) = {S | STATEMENT S MIGHT DEFINE STORAGE LOCATION X}
400

MUSTDEF (X) = {S | STATEMENT S MUST DEFINE STORAGE LOCATION X}
405

DEFLOC (B,X*) = {S | STATEMENT S IS IN MAYDEF(X*), STATEMENT S IS IN BLOCK B, AND NO LATER STATEMENT S' IN BLOCK B IS IN MUSTDEF(X*)}
410

MASK (B,X*) = {BOOLEAN | BOOLEAN = TRUE IF AND ONLY IF BLOCK B CONTAINS A STATEMENT S IN MUSTDEF (X*); OTHERWISE FALSE}
415

DEFIN (B,X*) = {S | STATEMENT S IS IN THE UNION OVER ALL PREDECESSORS P OF BLOCK B OF DEFOUT (P,X*)}
420

DEFOUT (B,X*) = {S | 425

STATEMENT S IS NULL IF BLOCK B WAS NOT EXECUTED;

STATEMENT S IS IN DEFLOC (B,X*) IF BLOCK B WAS EXECUTED AND MASK(B,X*) = TRUE; AND

STATEMENT S IS IN DEFIN(B,X*) U DEFLOC(B,X*) IF BLOCK B WAS EXECUTED AND MASK(B,X*) = FALSE.}

FIG. 4

FINDING THE SOURCE STATEMENT OF THE DEFINITION OF A STORAGE LOCATION

FIELD

An embodiment of the invention generally relates to finding and presenting the statement that is the source of the definition of the content of a storage location that is referenced by a program.

BACKGROUND

Computer systems typically include a combination of computer hardware (such as semiconductors, circuit boards, processors, and storage devices) and computer programs. The computer programs are stored in the storage devices and are executed by the processors. As the sophistication and complexity of computer programs increase, the programs become more difficult to debug. Bugs are problems, faults, or errors in a computer program. Locating, analyzing, and correcting suspected faults in a computer program is a process known as "debugging." Typically, a programmer uses another computer program commonly known as a "debugger" to debug the program under development.

Conventional debuggers typically support three primary types of operations, which a computer programmer may request via a user interface. A first type is a breakpoint operation, which permits a programmer to identify with a breakpoint a precise instruction at which to halt execution of the program by the processor. As a result, when a program is executed by the debugger, the program executes on the processor in a normal fashion until the breakpoint is reached, at which time the debugger halts execution of the program. A second type is a step operation, which permits a computer programmer to cause the processor to execute instructions in a program either one-by-one or in groups. After each instruction or group of instructions are executed, the debugger then halts execution of the program. Once the execution of the program is halted, either by step or breakpoint operations, conventional debuggers provide a third type of operation, which displays the content that is stored at various storage locations, in response to requests by the programmer. By this debugging process of halting the program at various instructions and examining the content of various storage locations, the programmer might eventually find the storage location whose stored content is incorrect or unexpected.

SUMMARY

A method, storage medium, and computer system are provided that, in an embodiment receive an identifier of a storage location, which is accessed by a program. While execution of the program is halted at a halted statement, a first source statement is determined that must have stored to the storage location. The program comprises the halted statement and the first source statement, and the halted statement is different than the first source statement. The first source statement is presented, in response to the determination. In an embodiment, while execution of the program is halted at the halted statement, a second source statement is determined that might have stored to the storage location, and the second source statement is presented.

BRIEF DESCRIPTION OF THE DRAWINGS

Various embodiments of the present invention are hereinafter described in conjunction with the appended drawings:

FIG. 2 depicts a block diagram of an example user interface presented via an I/O (Input/Output) device, according to an embodiment of the invention.

FIG. 4 depicts a block diagram of an example data structure for sets, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
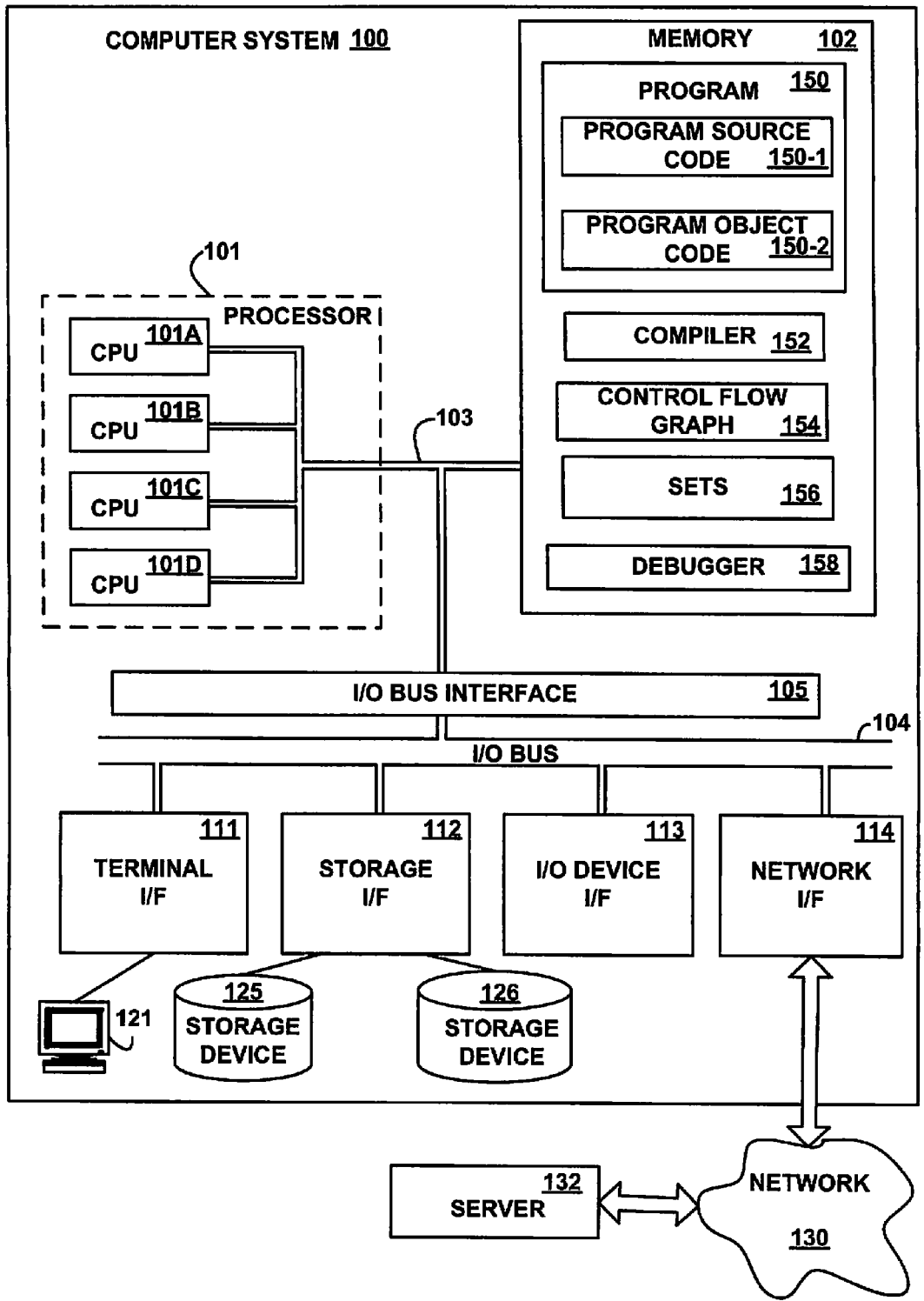
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a computer system 132, according to an embodiment of the present invention. In an embodiment, the hardware components of the computer systems 100 and 132 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a program 150, a compiler 152, a control flow graph 154, sets 156, and a debugger 158. Although the program 150, the compiler 152, the control flow graph 154, the sets 156, and the debugger 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the program 150, the compiler 152, the control flow graph 154, the sets 156, and the debugger 158 are illustrated as being contained within the main memory 102, these elements are not necessarily all completely contained in the same storage device at the same time. Further, although the program 150, the compiler 152, the control flow graph 154, the sets 156, and the debugger 158 are illustrated as being separate entities, in other embodiments some of them, portions of some of them, or all of them may be packaged together.

The program 150 includes a source code version 150-1 and an object code version 150-2. The program source code 150-1 is a version of the program 150 that includes text written in a computer language (the source language). The program object code 150-2 is a version of the program 150 that is expressed in another computer language (the target language). The compiler 152 is a computer program (or set of programs) that translates (or compiles) the program source code 150-1 into the program object code 150-2. In an embodiment, the program object code 150-2 is in a form suitable for processing by other programs (e.g., a linker) and may be expressed as assembly language or machine language capable of executing on the processor 101. In an embodiment, the compiler 152 performs some or all of lexical analysis of the program, parsing of the program, semantic analysis of the program, code generation of the program object code 150-2, and optimization of the program object code 150-2. In an embodiment, the compiler 152 is a stand-alone compiler, but in another embodiment, the compiler 152 is a just-in-time (JIT) compiler that operates as a portion of an interpreter.

The compiler 152 further creates the control flow graph 154 and a portion of the sets 156 from the program 150. The control flow graph 154 is a representation, using graph notation, of all execution paths that are possible for the program 150 to traverse during the execution of the program 150 on the processor. The control flow graph 154 is further described below with reference to FIG. 3. The sets 156 are further described below with reference to FIG. 4.

The debugger 158 manages breakpoints in the program 150 in response to receiving a breakpoint command, which may be issued on a command line, entered through a graphical user interface, or issued via an application. A breakpoint is a statement or instruction within the program 150 at which the user desires to halt execution of the program 150. As a result, when the program 150 is executed by the debugger 158, the program 150 executes on the processor 101 in a normal fashion until the breakpoint is reached. The debugger 158 then stops execution of the program 150 at the breakpoint instruction and displays the results and/or state of the program 150 and/or the state of the computer system 100 to the programmer for analysis, via a debugger user interface.

The debugger 158 sets breakpoints in the program 150, e.g., by replacing a valid statement or instruction at a breakpoint location in the program 150 with an invalid instruction and by creating a record for the breakpoint in a breakpoint table. After the breakpoints are set, the user provides an input to a debug user interface that resumes execution of the program 150. In response to the execution of the program 150 eventually encountering the invalid statement or instruction, a system exception or interrupt occurs, which gives control of the processor 101 to the debugger 158. The debugger 158 then gives control to the user via a debug user interface, and the user may then issue commands to the debugger 158 via the user interface, which the debugger 158 interprets to find and display the statements that define the content of an input storage location, to display the contents of storage locations, to set or remove breakpoints, to resume execution of the program 150, or any other appropriate operations. The debugger 158 further reads the control flow graph 154 and the sets 156, creates a portion of the sets 156, and uses the control flow graph 154 and the sets 156 to find the statements within the program 150 that might or must define, write, store, or modify the content of an input storage location.

In an embodiment, one or both of the compiler 152 and the debugger 158 include instructions or statements capable of executing on the processor 101 or instructions or statements capable of being interpreted by instructions or statements that execute on the processor 101, to carry out the functions as further described below with reference to FIGS. 5, 6, 7, 8, 9, and 10. In an embodiment, one or both of the compiler 152 and the debugger 158 are implemented in hardware via semiconductor devices, chips, logical gates, circuits, circuit cards, and/or other physical hardware devices in lieu of, or in addition to, a processor-based system. In an embodiment, one or both of the compiler 152 and the debugger 158 may also include data in addition to instructions or statements.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device). A user may manipulate the user input devices, in order to provide input to the user terminal 121 and the computer system 100 via a user interface, and may receive output via the user output devices. For example, a user interface may be presented via the user terminal 121, such as displayed on a display device, played via a speaker, or printed via a printer.

The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). In another embodiment, the devices 125 and/or 126 may be implemented via any type of secondary storage device. The contents of the main memory 102, or any portion thereof, may be stored to and retrieved from the direct access storage devices 125 and 126, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3 specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network.

In another embodiment, the network 130 may be a FRS (Family Radio Service) network. In another embodiment, the network 130 may be any appropriate cellular data network or cell-based radio network technology. In another embodiment, the network 130 may be an IEEE 802.11b wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100, the network 130, and the computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when read and interpreted by instructions that execute on the one or more processors, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125 or 126), the main memory 102, CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of the invention.

FIG. 2 depicts a block diagram of an example user interface presented via the I/O (Input/Output) device 121, according to an embodiment of the invention. In various embodiments, the example user interface is presented by the debugger 158 by being displayed on a display device, by being played over speakers, by being printed via a printer, or via any other appropriate presentation technique. The example user interface includes a program listing 200, a find source definition command 210, and a result definition presentation 215. The user sends commands to the debugger via the user interface by manipulating a user input device, as previously described above.

The program listing 200 illustrates a variety of statements or instructions of the program 150, each identified by a statement number. The statements are organized and divided into basic blocks 205-1, 205-2, 205-3, 205-4, 205-5, 205-6, 205-7, 205-8 and 205-9. At the time represented by FIG. 2, execution of the example program 150 is halted at statement number "30" within the basic block 205-6.

A basic block is a unit of the program 150 that includes one or more statements or instructions. A basic block has only one entry point (i.e., no code within the basic block is the destination of a jump, call, or other control flow instruction), one exit point (i.e., control flow leaves the basic block via only one instruction or statement), and the basic block contains no jump instructions or other control flow statements (other than the possible exception of the last instruction in the basic block).

The start of a basic block may be jumped to, from more than one location within this or another program. In various embodiments, the end of a basic block is a jump instruction or is the statement or instruction immediately before or prior to the destination of a jump instruction. Basic blocks are often the unit to which compiler optimizations are applied. Basic blocks form the vertices or nodes in the control flow graph 154, as further described below with reference to FIG. 3. In various embodiments, code may be source code, assembly code, executable instructions, interpretable statements, or any other type of code sequence.

To more formally define a basic block, a sequence of instructions forms a basic block if the instruction in each position in the sequence dominates, or always executes before, all those instructions in later (later in execution time within the control flow) positions within the sequence, and no other instruction executes between two instructions in the sequence. Thus, a basic block is allowed to include unconditional jumps to statements that are not targeted by other jumps within the basic block. The basic blocks to which control may next transfer after reaching the end of a basic block are called that basic block's successors, and the basic blocks from which control might have come when entering a basic block are called that basic block's predecessors. (A basic block's predecessors are defined to be its immediate predecessors, meaning that no intervening block exists between a basic block and its predecessor block(s).) Predecessor and successor blocks are defined by the possibility of flow control transfer, not actual flow control transfer during execution, since the actual path of control flow might not be capable of being determined by the compiler 152 until the program 150 is executed.

In an embodiment, the compiler 152 generates basic blocks from the program listing 200 by reading the program 150 and marking basic block boundaries, which are the instructions that may either begin or end a basic block because those instructions either transfer control or accept control from another point or location within the program 150. Then, the compiler 152 cuts the program 150 listing at each of these points, and the basic blocks are the sequence of instructions between each of these points.

In various embodiments, instructions that end a basic block include unconditional and conditional branches or jumps (both direct and indirect); returns to a calling procedure; instructions that might throw, cause, or generate an exception, cause an interrupt, or generate an error; or function calls that might not return (such as functions that throw or generate exceptions, interrupts, or errors). In various embodiments, instructions that begin a new basic block include procedure and function entry points, targets of jumps or branches, fall-through instructions following conditional branches, instructions following other instructions that throw or generate exceptions, and exception handlers.

The find source definition command 210 includes an identifier of a storage location (e.g., the identifier "v") that identifies, specifies, or names a storage location(s) and requests that the debugger 158 find and present the result definition 215, which includes zero, one, or more identifiers of statements 245 and zero, one, or more identifiers of statements 250. A user requests that the find source definition command 210 be sent to the debugger via the user interface and manipulation of a user input device.

The result definition 215 presents the statements 245 that must have defined/stored/written a data value to the contents at the storage location or address identified by the identifier specified in the find source definition command 210. As used herein, a statement 245 must have defined the contents of a storage location when the statement 245 was executed if the debugger 152 determines that the probability that the statement wrote or stored a value to the storage location is one. (A probability of an event is represented by a real number in the range from zero to one. An impossible event has a probability of zero, and a certain event has a probability of one.)

The statements 245 may include zero, one, or more statements that must have defined the contents of the storage location because different statements may have written or stored the same or different values to the storage locations at different times when those statements were executed. Thus, while a statement 245 must have written a value to the specified storage location, that value is not necessarily still stored at the specified location at the time that the program is halted (e.g., halted at the basic block 205-6) because it might have been overwritten by a subsequent value, by other of the statements 245 or the statements 250.

The result definition 215 presents the statements 250 (or identifiers of the statements) in the program 150 that might possibly have defined/stored/written a data value to the contents at the storage location or address identified by the identifier specified in the find source definition command 210. As used herein, a statement 250 might possibly have defined/written/stored a value if the debugger 152 determines that the probability that the statement 250 defined/wrote/stored a value is greater than zero and less than one, meaning that the debugger 152 cannot completely rule out or exclude the possibility that the statement 250 defined/wrote/stored a value to the contents of the storage location when the statements 250 in the program 150 were executed. The statements 250 may include zero, one, or more identifiers of statements. If the statement 250 did write a value to the contents of the specified storage location, that value is not necessarily still stored at the specified location at the time that the program is halted (e.g., halted at the basic block 205-6) because it might have been overwritten by a subsequent value, either by another of the statements 250 or by one or more of the statements 245.

The statements 245 and 250 presented in the result definition presentation 215 may identify any statement within the program 150 that was previously executed prior to the statement at which execution of the program is halted. In an embodiment, some or all the statements 245 and 250 are different from the statement at which execution of the program is halted. Discovering the statement(s) that might or must define/store content to a storage location ("v" in this example) is helpful because merely knowing the storage location ("v" in this example) that has incorrect or unexpected content is often only a symptom of an underlying problem and not the cause of the underlying problem.

In various embodiments, an identifier of a storage location identifies one storage location or related storage locations (capable of being accessed as a unit) that are capable of being read and capable of being set to a variety of values (more than one different value) at different times. In various embodiments, the storage location(s) are implemented as main memory, random access memory, secondary storage, a disk drive, a register(s), semiconductor memory, or any portion, multiple, or combination thereof. In various embodiments, the identifier, as named, referenced, and/or accessed by the program 150 is a variable, a register, a data structure, a name of a data structure, a record, a field, a key, an array, a pointer, or an object.

The result definition 215 further displays the contents 255 of the storage location identified by the storage location identifier 260, as it existed at the time that the program halted. The execution of one of the statements 245 or 250 wrote the contents 255 to the storage location identified by the identifier 260 at some time in the past prior to the halt of the program.

Figure 3:
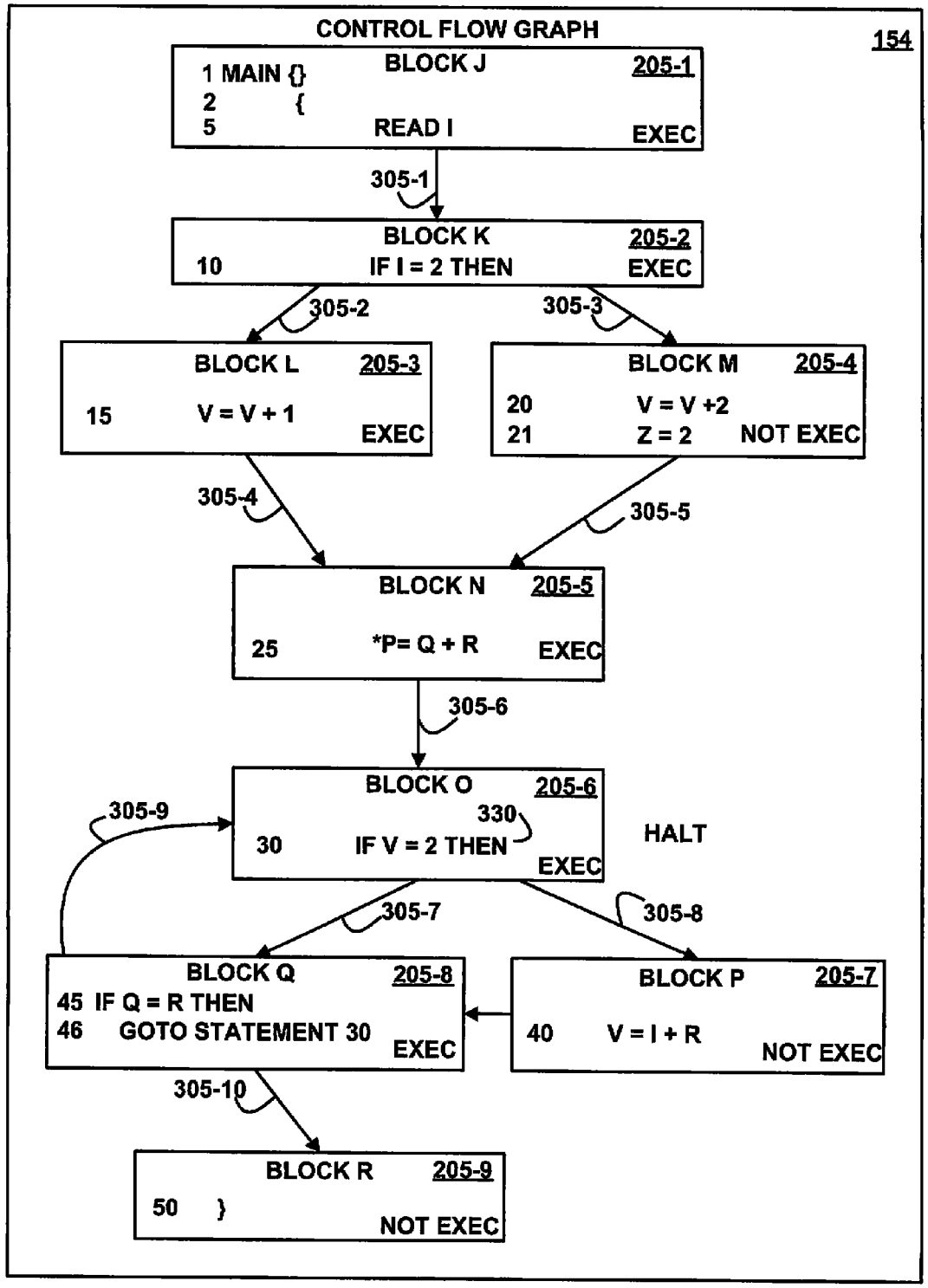
FIG. 3 depicts a block diagram of an example data structure for a control flow graph, according to an embodiment of the invention.

FIG. 3 depicts a block diagram of an example data structure for a control flow graph 154, according to an embodiment of the invention. The control flow graph 154 is a representation, using graph notation, of all execution paths through the basic blocks 205-1, 205-2, 205-3, 205-4, 205-5, 205-6, 205-7, 205-8 and 205-9 that are possible for the execution of the program to traverse. Each node in the control flow graph 154 represents a basic block in the program 150. The directed edges 305-1, 305-2, 305-3, 305-4, 305-5, 305-6, 305-7, 305-8, 305-9, and 305-10 between the basic blocks represent changes in the control flow of the program 150 caused by control flow statements in the program. Directed edges have an associated direction, meaning that the flow of control of the basic blocks flows from the node at the tail of the directed edge to the node pointed to by the head of the directed edge, but the flow of control does not flow from the node pointed to by the head to the node at the tail.

Control flow (or alternatively, flow of control) refers to the order in which the basic blocks and the order in which the individual statements, instructions and/or function calls of the basic blocks are executed by the processor 101. A control flow statement is an instruction that, when executed, can cause (conditionally or unconditionally) a change in the subsequent control flow to differ from the natural sequential order (i.e., from beginning to end or top to bottom), in which the instructions in the basic blocks are listed within the program listing 200 of the program 150.

The types of control flow statements available differ between programming languages, but may be categorized by their effect on the order of the basic blocks as follows:

1) a statement that causes flow control to continue at a different statement (a jump);

2) a statement that causes a set of statements to be executed only if a condition is met or a expression evaluates to true (a choice or condition);

3) a statement that causes a set of statements to be executed zero or more times, until a condition is met or while a condition is met (a loop);

4) a statement that causes a set of distant statements to be executed, after which the flow of control may possibly return (a call or invocation of a subroutine, subprocedure, method, or another program); and 5) a statement that stops or halts execution of the program 150, which prevents any further execution of the program 150, unless and until the execution is restarted.

In an embodiment, control flow statements work (when executed) by altering the program counter used by the processor to determine the next statement or instruction to execute. As used herein, control flow is restricted to a single thread of execution, as it depends upon a definite sequence in which instructions are executed by the processor, one at a time.

The compiler creates the control flow graph to represent the possible execution paths because the actual execution path is often dependent on values of data that the program reads when it executes, and the compiler does not necessarily know those values since the compiler creates the control flow graph prior to some or all of the statements of the program being executed. For example, whether block 205-3 or 205-4 is executed depends on the value of the variable "I," which is not known until it is read by the execution of the block 205-1 and compared against "2" by the execution of the block 205-2.

The control flow graph 154 includes two specially designated basic blocks: the entry block 205-1, through which control enters into the control flow graph 154, and the exit basic block 205-9, through which all control leaves the control flow graph 154. Thus, a path is an alternating sequence of nodes and directed edges that starts at the entry node 205-1 and terminates at the exit node 205-9.

The debugger 158 has marked the basic blocks 205-1, 205-2, 205-3, 205-5, 205-6, and 205-8 as executed, meaning that the statements or instructions within or associated with those basic blocks were previously executed by the processor prior to the time that execution of the program 150 was halted at the basic block 205-6. The debugger 158 has marked the basic block 205-6 as halted, meaning that the execution of the program 150 on the processor 101 is currently halted at the statement or instruction 330 within, or associated with, the basic block 205-6. The debugger 158 has marked the basic blocks 205-4, 205-7, and 205-9 as not executed, meaning that the statements or instructions within, or associated with, those basic blocks were not executed by the processor prior to the time that execution of the program 150 was halted at the basic block 205-6. In various embodiments, the debugger 158 associates bit(s), register(s), or memory location(s) with each basic block and stores an indication of whether or not the basic block has been execute in the associated bit(s), register(s), or memory location(s).

FIG. 4 depicts a block diagram of an example data structure for the sets 156, according to an embodiment of the invention. The compiler 152 and the debugger 158 create, access, and/or modify the sets 156, which represent information regarding the statements, the basic blocks, and the execution of the statements and the basic blocks within the program 150. The sets 156 include the MayDef(X) set 400 (may-define set), the MustDef(X) set 405 (must-define set), the DefLoc(B,X*) set 410 (defined-locally set), the Mask(B,X*) set 415, the DefIn (B,X*) set 420 (Definition-In), and the DefOut(B,X*) set 425 (Definition-Out).

The MayDef(X) set 400 includes as its elements or members all statements S (or identifiers of statements or instructions) in the program 150 that the compiler determines might define, write, or store a value to the contents of the storage location X, for all storage locations X in the program 150. A statement might store a value to the storage location X if the compiler 152 determines that the probability that the statement will store a value to the storage location is greater than zero and less than one, i.e., the compiler 152 cannot completely rule out the possibility that the statement will store a value to the storage location when the program 150 is executed because the compiler 152 cannot determine the contents of the pointer (the address to which the pointer points) that the statement references, uses, accesses, or causes to be referenced, used, or accessed since the contents of the pointer will not be known until the program object code 150-2 is executed. A statement also might store a value to the storage location X if the compiler 152 determines that the probability that the statement will store a value to the storage location is equal to one, i.e., the compiler 152 determines that the statement is certain to directly store a value to the contents of the storage location X if the statement is executed.

The MustDef(X) set 405 includes as its elements all statements S (or identifiers of statements) in the program 150 that must define or write a value to the contents of the storage location X. The MustDef(X) set is a subset of the MayDef(X) set. The compiler 152 creates a MustDef(X) set for each storage location X that is referenced by an statement or instruction in the program 150. A statement must define, write, or store a value if the compiler 152 determines that the probability that the statement will define, write, or store a value to the storage location is equal to one, meaning the statement is certain to define, write, or store a value to the storage location if the statement is executed. The compiler 152 calculates the MayDef(X) and MustDef(X) sets and the probabilities of the statements without knowledge of whether or not the statements will be executed since the statements have not executed at the time the compiler 152 creates the MayDef(X) and MustDef(X) sets.

The compiler 152 adds to MayDef(X) those assignment statements (or adds identifications of the assignment statements) in the program 150 that include an assignment target that uses a pointer de-reference, for all storage locations X used by the program 150, subject to data flow analysis and alias class processing, as further described below. The compiler 152 does not add to MustDef(X) those assignment statements where the assignment target uses or needs a pointer de-reference, for all storage locations X used, referenced, or accessed by the program 150, subject to data flow analysis and alias class processing, as further described below.

A pointer is a programming language data type whose contents or value refers directly to (or "points to") another value stored elsewhere in the computer memory using the address of the other value. That is, when the program 150 that contains or accesses the pointer is executed, the storage location of the pointer stores the address at which the other value is located or stored. Obtaining the other value to which a pointer refers to or points at is called de-referencing the pointer. The compiler 152 is not necessarily able to de-reference pointers because the contents of the pointer are not necessarily known by the compiler 152 at the time the compiler 152 creates the program object code 150-2 since the contents of the pointer might be dependent on data and/or calculations that the program object code 150-2 reads and performs, respectively, as the program object code 150-2 executes.

Pointers can be more clearly understood using the following example. An example statement (within the program source code 150-1) for defining a pointer is:

int *mypointer.

The above example statement declares "mypointer" as a pointer to an integer, i.e., as a pointer whose contents point to a storage location whose contents are interpreted or used in the format of an integer. When the program object code 150-2 that the compiler 152 creates from the above example statement is executed, the processor, in response to reading the program object code 150-2, assigns to mypointer a storage location, e.g., the storage location whose address is 0x1111.

Now that mypointer is declared, it may point at another storage location via the following example statements:

int myvariable=4; and mypointer=&myvariable.

In response to the program object code 150-2 that the compiler 152 created from the above example statements being executed, the processor stores 0x0004 in the storage location associated with myvariable and assigns the value (the contents) of mypointer to be the address of myvariable. For example, if myvariable is stored at a memory location of 0x2222, then the memory location at address 0x2222 contains 0x0004 as its contents, and the value of mypointer (the contents at the storage location 0x1111) is 0x2222 after the assignment statements are executed.

The following example statement (when executed by the processor as part of the program object code 150-2, which was created by compiling the example statement) de-references the pointer:

*mypointer=3.

The above example statement causes the compiler 152 to generate a portion of the program object code 150-2 that, when executed by the processor, reads the contents (the contents stored at 0x1111) of mypointer (which is 0x2222), finds the address 0x2222 in memory and stores 0x0003 into the contents of the storage location at address 0x2222. If the program object code 150-2 then prints the value of myvariable, the value printed is 0x0003.

In an embodiment, the compiler 152 adds to both MayDef (X*) and MustDef(X*) those statements (or identifications of the statements) in the program 150 that directly store (i.e., store without needing to de-reference a pointer) a value to a specific target storage location X*.

In an embodiment, the compiler 152 adds to MayDef(X), but not MustDef(X), those statements S that call, invoke, or jump to another entity, such as a program, procedure, subroutine, method, or subprogram. In another embodiment, the compiler 152 adds to MayDef(X), but not MustDef(X), those statements S that call or invoke another entity, where the called or invoked entity includes an assignment statement with an assignment target that uses a pointer de-reference.

In an embodiment, the compiler 152 adds to both MayDef(X*) and MustDef(X*) those statements S that call, invoke, or jump to another entity, where that called, invoked, or jumped to entity directly stores (i.e., stores without needing to de-reference a pointer) a value to a specific target variable X*, which may occur, e.g., if X* is a global variable or if the statement passes X* by reference to the called entity.

The compiler 152 creates the MayDef(X) and MustDef(X) sets for each storage location X that is referenced, defined, accessed, used, read, written, or allocated by or to the statements in the program 150. Using the example of FIG. 2, the compiler 152 creates the sets: MayDef(I), MayDef(V), MayDef(Q), MayDef(R), MayDef(Z), MustDef(I), MustDef(V), MustDef(Q), MustDef(R), and MustDef(Z) because "I," "V," "Q," "R," and "Z" are the identifiers of storage locations referenced, defined, accessed, used, read, written, or allocated by or to the program 150.

In an embodiment, the compiler 152 creates MayDef(X) and the MustDef(X) from alias information (e.g., alias classes, which are further described below), which indicate which variables might be modified by indirect storage references, such as pointers, as further described below.

A symbol in the program 150 that represents a storage location or variable that may share storage with another symbol is referred to as an "alias" of, or is said to be aliased with, the other symbol. Two pointers are said to be aliased if they point to the same location. The compiler 152 uses a technique called alias analysis to determine if a storage location can be accessed in more than one way, i.e., to determine if separate memory references point to the storage location. Alias analysis allows the compiler 152 to determine which variables in the program 150 will or might be modified by a particular statement when the code is executed. Compilers attempt to transform program source code 150-1 into the most efficient program object code 150-2 that is equivalent to the program source code 150-1. If the compiler 152 can determine that two pointers are not aliases of one another, then the compiler 152 can generate more program object code 150-2 that executes faster; thus, alias analysis helps the compiler 152 create program object code 150-2 that is more efficient. To understand aliasing, consider the following code fragment, which accesses members of structures: "p.foo=1; q.foo=2; i=p.foo+3;".

There are three possible alias cases for the aforementioned code fragment: the variables p and q cannot alias; the variables p and q must alias; or the compiler 152 cannot conclusively determine at compile time if p and q alias or not.

If p and q cannot alias, then the compiler 152 can change i=p.foo+3; to i=4. If p and q must alias, then the compiler 152 can change i=p.foo+3; to i=5. In both cases, the compiler 152 performs optimizations from the alias information. But, if it is not known if p and q alias or not, then the compiler 152 cannot optimize the code fragment, and the program object code 150-2 must be executed in order to determine the value of i. Two memory references are said to have a may-alias relation if their aliasing is unknown.

In alias analysis, the compiler 152 divides the program's memory into alias classes. Alias classes are disjoint sets of storage locations that cannot alias to one another. In an embodiment, the compiler 152 does not allow two variables or pointers of different types to be in the same alias class since it is a property of strongly typed, memory reference-free (i.e. references to memory locations cannot be changed directly) languages that two variables of different types cannot share the same memory location simultaneously. In an embodiment, the compiler 152 does not allow allocations local to the current stack frame to be in the same alias class as any previous allocation from another stack frame because new memory allocations must be disjoint from all other memory allocations. In an embodiment, the compiler 152 creates a separate alias class for each record field of each record type because typing only allows for records of the same type to alias. Since all records of a type will be stored in an identical format in memory, a field can only alias to itself. In an embodiment, the compiler 152 creates a separate alias class for each array of a given type. In an embodiment, the compiler 152 gives every load and store to memory its own class, which creates the property that, given memory locations Ai and Bj with i, j alias classes, that if i=j then Ai may-alias Bj, and if i does not equal j, then Ai and Bj do not alias.

In an embodiment, the compiler 152 performs flow-based alias analysis, in which the compiler 152 creates new alias classes for each memory allocation and for each global and local variable whose address has been used. References may point to more than one value over time and thus may be in more than one alias class, which means that each memory location belongs to a set of alias classes instead of a single alias class.

In an embodiment, the compiler 152 performs keyword alias analysis. The programmer adds special keywords to the program source code 150-1, which informs the compiler 152 that one pointer does not alias another.

In an embodiment, the compiler 152 uses the symmetric property of aliasing, i.e., if x is an alias of y, then y is also an alias of x; uses the reflexive property of aliasing, i.e., x is an alias of itself); and uses the transitive property of aliasing, i.e., if x is an alias for y, and y is an alias for z, then z is an alias of x. The exception to alias symmetry is call induced aliasing. The exception to alias transitivity is structural aliasing.

In structural aliasing, two symbols are mapped to overlying regions in memory. In some language models, structural aliasing only occurs between members of an aggregate symbol (such as a union or a structure in the C programming language) or between the members and the aggregate symbol which contains them.

Call induced aliasing results from the fact that a called procedure can reference storage locations that are accessible to the calling procedure. For example, a C function can modify the value of a variable defined as an external data type, in which case the function is aliased with the external variable. Pointer induced aliasing results from storage locations that are referenced through pointer indirection.

In an embodiment, the compiler 152 determines alias information using the rules of the language being compiled. For example, in ANSI standard C, a pointer to an integer value is precluded from pointing to a floating point value. Accordingly, the compiler 152 determines that, if p has been declared as a pointer to a floating point data type and x is declared as an integer data type, then *p cannot point to x and thus they are not aliased, and the compiler 152 categories them in separate alias classes.

In an embodiment, the compiler 152 performs compilation unit aliasing analysis. As used herein, the term "compilation unit" is intended to comprise any block of program code which is processed independently of other units of program code in the first stage of a compilation process. As used herein, the term "first stage of a compilation process" comprises the stage in the compilation process wherein the compiler 152 is operating on language-specific instructions, rather than on instructions in a non-language specific intermediate instructions. For example, a single file of source code and a single function definition are compilation units. In an embodiment, compilation units may also comprise such blocks of a program that are written in different languages. For example, the user interface portions of a program may be written in C++ while mathematical functions in the program may be written in Fortran 90.

In determining alias information at the inter-compilation unit level, the compiler 152 considers two different types of program information: the visible portion of the program and the invisible portion of the program. The visible portion of the program comprises those compilation units for which the compiler 152 has detailed information, such as storage location type definitions and uses. The invisible portion of the program comprises the compilation units for which the compiler 152 has little or no information, such as libraries.

At the inter-compilation unit level, the compiler 152 adds to the same alias class any shadow in a visible compilation unit and all mapped storage locations whose addresses are explicitly taken in the visible portion of the program. The compiler 152 adds to the same alias class any shadow and the universal object since no information to the contrary is available. Finally, for similar reasons, the compiler 152 adds to the same alias class any storage locations that are owned by the visible portion of the program and the universal object.

Thus, variables or pointers that are in different alias classes do not alias to each other, so if the storage location identified by X is in one alias class and a statement ST1 accesses a pointer P1 that is in another alias class, then, in an embodiment, the compiler 152 does not add that statement ST1 to either MayDef(X) or MustDef(X). But, if the storage location X and the pointer P1 are in the same alias class, then the compiler 152 adds statement ST1 to MayDef(X) and/or MustDef(X). The compiler 152 adds that statement ST1 to MustDef(X) if the compiler can prove (in an embodiment using dataflow analysis of the control flow graph) that the statement ST1 definitely will modify X if the statement ST1 is executed. For example, if the compiler determines that the statement ST1 directly sets the pointer P1 to contain the address of storage location X and the statement ST1 is the only definition of the pointer P1 that reaches the current statement (which accesses the storage location X) being compiled by the compiler, then the compiler knows that the statement ST1 modifies the storage location X, so the compiler adds the statement ST1 to MustDef(X) as well as to MayDef(X). If the compiler cannot prove that the storage location X will be modified by the store performed by the statement ST1 (if the statement ST1 is executed) via the pointer P1, then the compiler adds the statement ST1 only to MayDef(X) and not to MustDef(X).

The DefLoc(B,X*) set 410 includes, as its elements, all statements S (or identifiers of statements or instructions), such that the statement S is an element of the MayDef(X*) set, and that statement S is in the basic block B, and no other later executed (later in time in the control flow) statement S' that is included in basic block B is an element of MustDef(X*), wherein the basic block B is any basic block in the program 150. That is, DefLoc(B,X*) is the set of statements in the block B (local to block B) that might possibly define or store the contents of X* from within the block B, and whose possible definitions of X* reach the end of block B, meaning that no later statement in block B definitely overwrites the definition of block B created by the set (i.e., no later statement in block B is in MustDef(B,X*). In an embodiment, the debugger 158 calculates the DefLoc(B,X*) sets by initializing all of them to empty, walking the MayDef(X*) set, adding each of its elements to the appropriate DefLoc(B,X*) set, and then walking the MustDef(X*) set, removing those statements from DefLoc(B,X*) that are previous (in control flow execution time) to a statement in MustDef(X*) in the same block B. In an embodiment, the debugger 158 numbers the statements in the block B in increasing order (from the beginning of the block B to the end of the block B) and walks or processes the sets in the increasing order, so as to perform linear passes over MayDef(X*) and MustDef(X*).

The debugger 158 creates a separate DefLoc(B,X*) set for each basic block B in the program 150. The storage location X* is identified by the input storage location identifier received with the find source definition command 210. Using the example of FIG. 2, the storage location identifier X* is the variable "V" in the program listing 200.

Each Mask(B,X*) set 415 includes, as its sole element, a Boolean value that is (or that can be evaluated to) either true or false. The Mask(B,X*) set is also known as a kill set. The debugger 158 creates a separate Mask(B,X*) set for each basic block B in the program 150. The storage location identifier X* is identified by the input storage location identifier received with the find source definition command 210, e.g., the storage location identifier "V" in FIG. 2. The Boolean value of Mask(B,X*) is true for a particular basic block B if and only if that basic block B contains a statement S that is an element of MustDef(X*). The Boolean value of Mask (B,X*) is false for a particular basic block B if and only if that basic block B does not contain a statement S that is an element of MustDef(X*). That is, Mask(B,X*) is true if any reaching definitions of the contents of X* (during execution) that flow into block B will not flow out of block B, because those contents are masked, overwritten, or "killed" by a statement within the block B that will definitely overwrite (if the statement is executed) the contents of X*. Stated another way, Mask(B,X*) is true if the possible contents of X* that exist at the time that execution of the program 150 enters block B will definitely be overwritten by a statement within block B (if the statement is executed).

The DefIn(B,X*) set includes as its element(s) all statements S (or identifiers of statements or instructions), such that S is an element of the set formed by the union over all predecessor basic blocks P of block B of all DefOut(P,X*) sets. Stated another way, the DefIn(B,X*) set includes as its elements all statements S that might have defined the contents of X* (the probability that statements S wrote values to X* is greater than zero) and those contents of X* can still exist (those contents were not definitely over-written by another statement's definition) at the time that the predecessor basic blocks P of block B completed execution. Stated still another way, the DefIn(B,X*) set includes statements S that might have defined the contents of X* and those defined contents can still exist in X*, can flow into, or can reach the block B. The debugger 158 creates a separate DefIn(B,X*) set for each basic block B in the program 150. The storage location identifier X* is identified by the input storage location identifier received with the find source definition command 210, e.g., the storage location identifier "V" in FIG. 2.

The DefOut(B,X*) set includes as its element(s) all statements S (or identifiers of statements or instructions), such that:

S is null, i.e., DefOut(B,X*) is empty, if the basic block B has not been executed prior to the time that the execution of the program was halted;

statement S is in DefLoc(B,X*) if the basic block B has been executed and Mask(B,X*) is true; and statement S is in DefIn(B,X*) UNION DefLoc(B,X*) if the basic block B has been executed and Mask(B,X*) is false.

"UNION" or "U," as used herein, refers to a set union operation. The debugger 158 creates a separate DefOut(B, X*) set for each basic block B in the program 150. The storage location identifier X* is identified by the input storage location identifier received with the find source definition command 210, e.g., the storage location identifier "V" in FIG. 2.

By setting DefOut(B,X*) to the empty set if the basic block B has not been executed, the debugger 158 prevents unexecuted statements from being identified in the result definition presentation 215 since unexecuted statements cannot possibly be the source of the definition of the contents of the storage location X*. Thus, the debugger creates a result definition presentation 215 that is based on the debugger's knowledge of the statements that were executed versus the statements that were not executed.

Thus, DefOut(B,X*) set includes as its elements all statements S that might have defined the contents of X* (the probability that statements S wrote values to X* is greater than zero) and those contents can still exist (those contents were not definitely over-written by another statement's definition) at the time that block B completed execution. Stated still another way, the DefOut(B,X*) set includes statements S that might have defined the contents of X* and those defined contents can flow out of or still exist in X* at the completion of the execution of the block B. "Can still exist" means that the debugger cannot completely rule out the possibility that the contents still exist.

Figure 5:
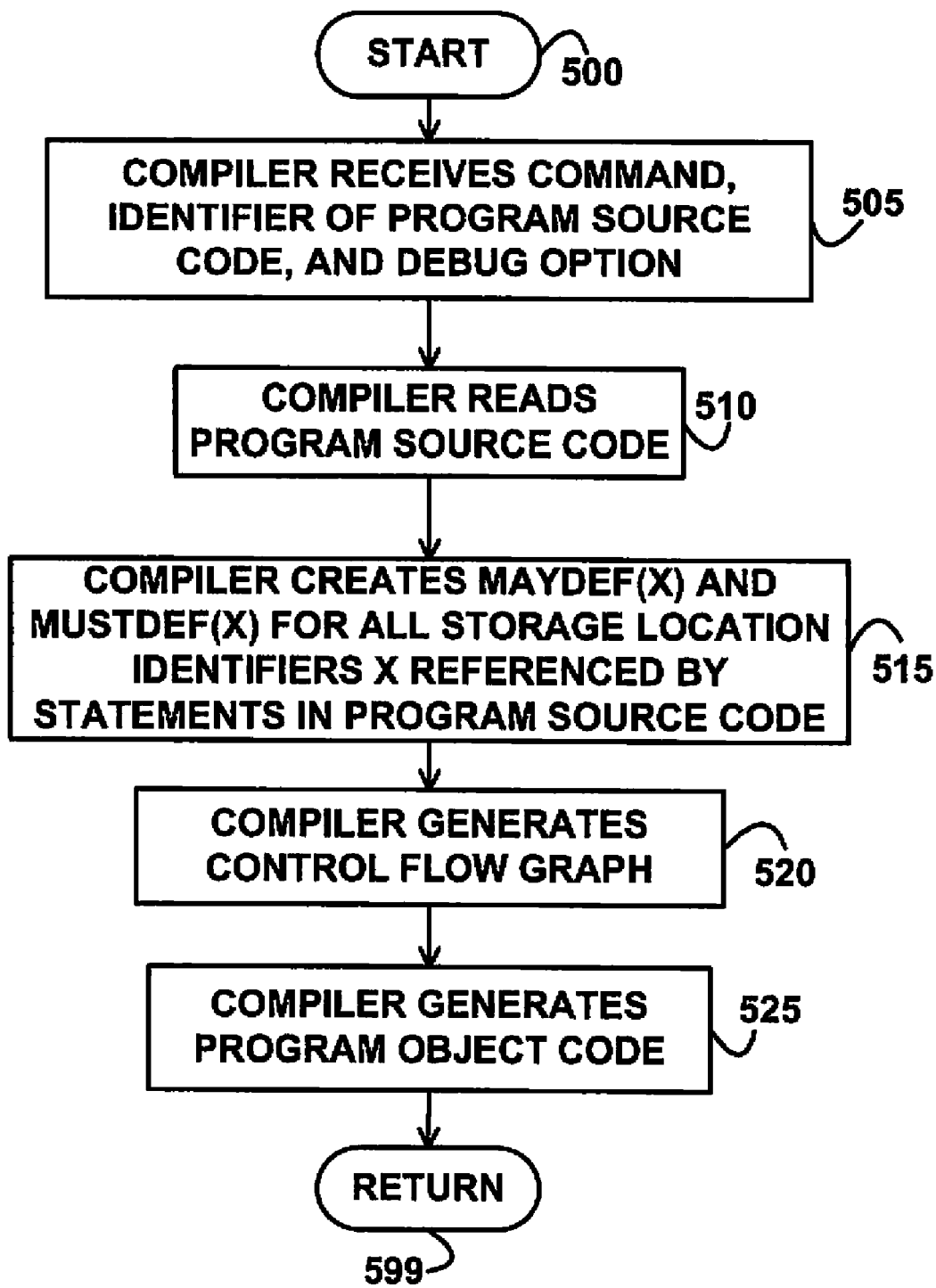
FIG. 5 depicts a flowchart of example processing for a compiler, according to an embodiment of the invention.

FIG. 5 depicts a flowchart of example processing for the compiler, according to an embodiment of the invention. Control begins at block 500. Control then continues to block 505 where the compiler 152 receives a command, an identifier of the program source code 150-1, and a debug option. In an embodiment, the compiler 152 receives the command from the user via a user interface or from another program such as an IDE (Integrated Development Environment), and the command instructs the compiler 152 to compile the program source code 150-1 identified by the identifier with a debug option, meaning that the compiler 152 is to create and store and/or return the MayDef(X) set 400, the MustDef(X) set 405, and the control flow graph 154.

Control then continues to block 510 where, in response to (as a result of and as caused by) receiving the command with the debug option, the compiler 152 reads the program source code 150-1 that is identified by the received identifier. Control then continues to block 515 where the compiler 152 creates the MayDef(X) and MustDef(X) sets, for all storage location identifiers X referenced, used by, or contained in statements in the program source code 150-1, as previously described above with reference to FIG. 4.

Control then continues to block 520 where the compiler 152 creates the control flow graph 154, as previously described above with reference to FIG. 3. Control then continues to block 525 where the compiler 152 creates the program object code 150-2 from the program source code 150-1 and returns or sends the MayDef(X) set 400, the MustDef(X) set 405, and the control flow graph 154 to the debugger 158. Control then continues to block 599 where the logic of FIG. 5 returns.

Figure 6:
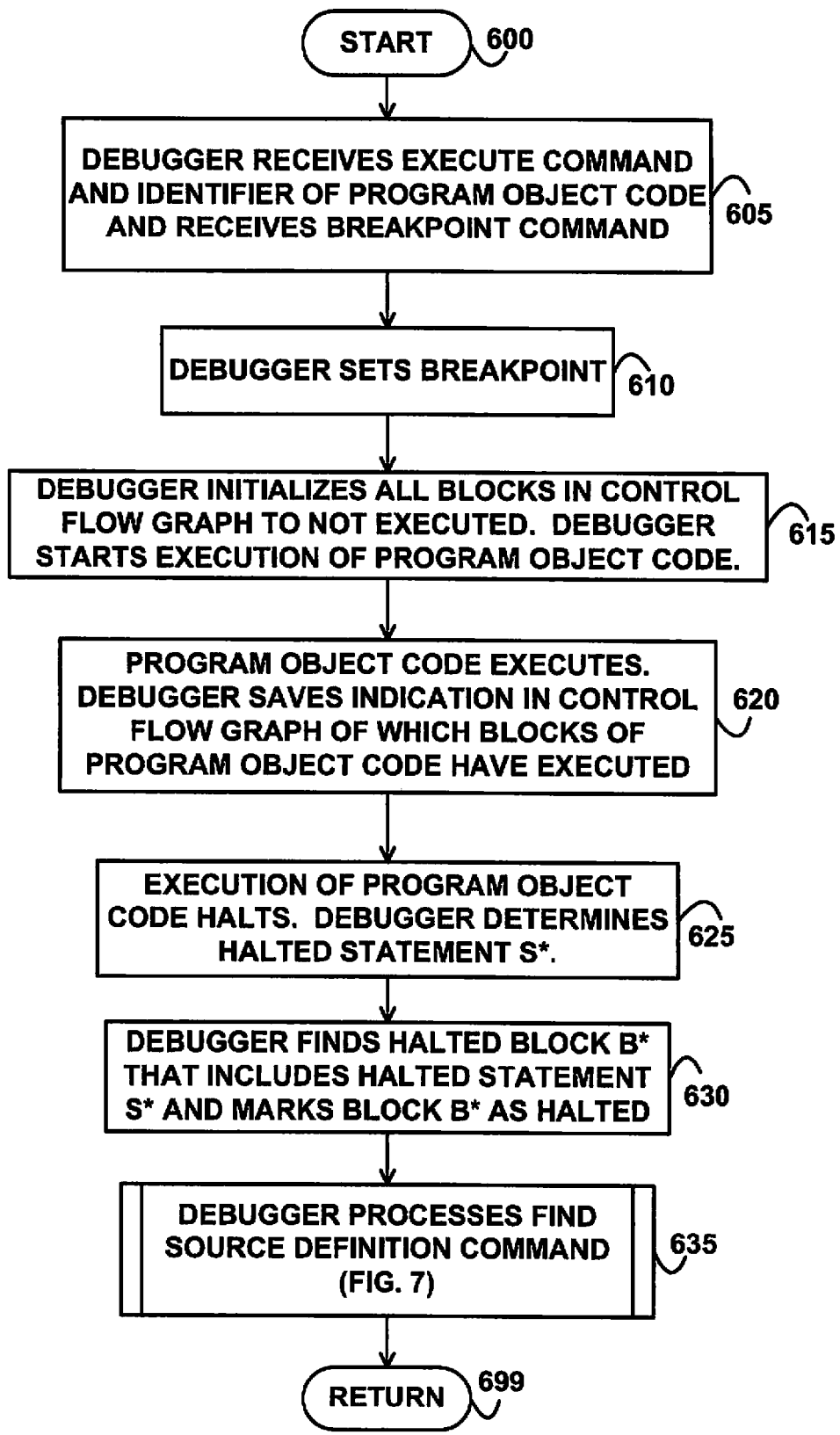
FIG. 6 depicts a flowchart of example processing for halting execution of a program, according to an embodiment of the invention.

FIG. 6 depicts a flowchart of example processing for halting execution of a program, according to an embodiment of the invention. Control begins at block 600. Control then continues to block 605 where the debugger 158 receives an identifier of the program object code 150-2 and receives a breakpoint command from the user interface. The program object code 150-2 was previously generated via the compilation of the source code with the debug option, as previously described above with reference to FIG. 5.

Control then continues to block 610 where the debugger 158 sets a breakpoint in the program object code 150-2. In various embodiments, the debugger 158 sets an unconditional breakpoint, a conditional breakpoint, an address watch breakpoint (a breakpoint that fires when the contents of a storage location are modified), a breakpoint that belongs to a breakpoint group, a breakpoint that is thread specific, or any other type of breakpoint. In an embodiment, the debugger 158 sets a breakpoint by replacing a valid instruction in the program object code 150-2 with an invalid instruction, which when executed causes the processor to raise an interrupt, which halts the execution of the program object code 150-2 at the invalid instruction and gives control of the processor to the debugger 158. The debugger 158 then replaces the invalid instruction with the valid instruction, which the debugger 158 previously saved. In another embodiment, the debugger 158 sets the breakpoint by setting an address watch function in the processor, which causes the processor to raise an interrupt when the processor modifies the contents of memory at an address that the debugger 158 specifies.

Control then continues to block 615 where the debugger 158 initializes indicators in, or associated with, all blocks in the control flow graph 154 to indicate that their respective blocks have not been executed. The debugger 158 then starts the program object code 150-2 executing on the processor.

Control then continues to block 620 where the program object code 150-2 executes on the processor. As the program object code 150-2 executes, the debugger 158 saves indications in, or associated with, the control flow graph 154, which indicate the respective blocks in the program object code 150-2 that were executed by the processor. In an embodiment, the debugger sets an internal breakpoint at the beginning of each basic block. In response to the execution of the program encountering the internal breakpoint, the debugger receives control and stores the indication that the respective basic block was executed. The debugger then restarts the program, which executes until it encounters the next internal breakpoint at the next basic block. Thus, the debugger executes the program one basic block at a time, storing the indications in response to the execution encountering each internal breakpoint. The debugger does not give control to the user interface in response to the execution encountering the internal breakpoints.

Control then continues to block 625 where execution of the program object code 150-2 continues until the breakpoint is encountered by the execution of the program object code 150-2, and the program object code 150-2 halts at the halted statement S*. The debugger 158 determines or finds the halted statement S* within the program object code 150-2 and/or within the program source code 150-1 at which the execution of the program 150 is halted or stopped, and the debugger 158 receives control of the processor. The program 150 being halted at the halted statement S* means that the statement or instruction prior (prior in execution time within the control flow) to S* has been executed by the processor, but the halted statement S* has not been executed and will not be executed until such future time (if any) that the debugger 158 restarts the program 150 executing. In an embodiment, the halted statement S* is the statement in the program source code 150-1 that is associated with the halted instruction in the program object code 150-2, or from which the halted instruction in the program object code 150-2 was generated by the compiler 152. In an embodiment, the halted statement S* is the halted instruction in the program object code 150-2.

Control then continues to block 630 where the debugger 158 finds the halted block B* within the program 150 that includes the halted statement S* and marks an indicator in, or associated with, the halted block B* in the control flow graph 154. The indicator then indicates that execution of the program object code 150-2 is halted at the halted block B*. Using the example of FIG. 3, the halted block is the block 205-6, and the halted statement is the statement 330.

Control then continues to block 635 where the debugger 158 receives and processes a find source definition command 210, as further described below with reference to FIG. 7.

Control then continues to block 699 where the logic of FIG. 6 returns.

Figure 7:
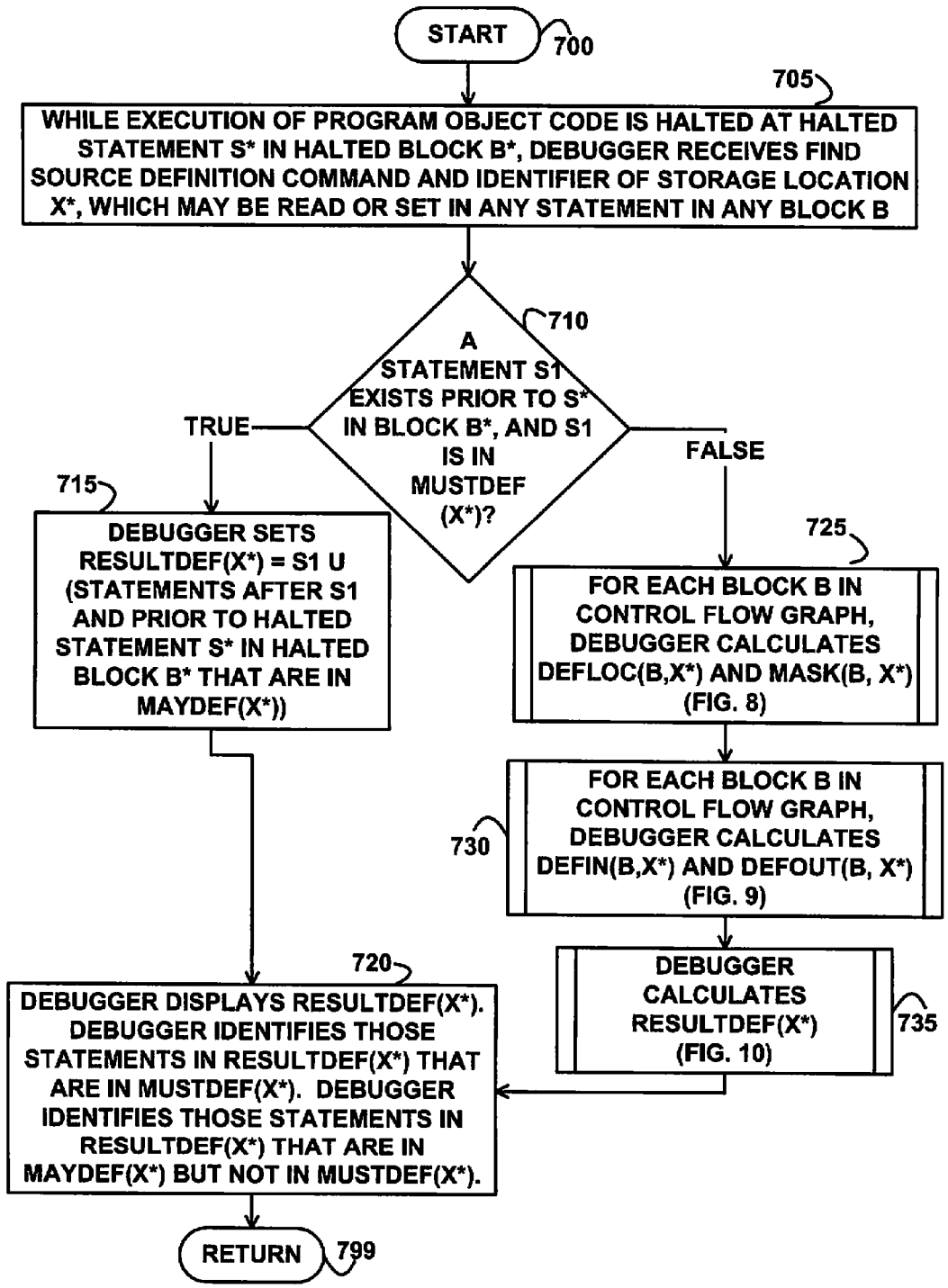
FIG. 7 depicts a flowchart of example processing for presenting the source of the definition of the contents of a storage location, according to an embodiment of the invention.

FIG. 7 depicts a flowchart of example processing for presenting the source of the definition of the contents of a storage location, according to an embodiment of the invention. Control begins at block 700. Control then continues to block 705 where the debugger 158 receives the find source definition command 210 from the user interface while the execution of the program object code 150-2 is halted at the halted statement S* in the halted block B*. The find source definition command 210 specifies an identifier or name of a storage location X*. In various embodiments, the storage location X* is capable of being read from or stored to by any statement, which may be located within any block within the program 150.

Control then continues to block 710 where the debugger 158 determines whether a statement S1 exists prior (prior in execution time within the control flow) to the halted statement S* in the halted block B* and the statement S1 is an element of the MustDef(X*) set (the MustDef set that is associated with the storage location X*, which was specified by the find source definition command 210).

If the determination at block 710 is true, then a statement S1 exists prior to the halted statement S* in the halted block B* and the statement S1 is an element of the MustDef(X*) set, so control continues to block 715 where the debugger 158 sets ResultDef(X*)=S1 UNION (the statements S3 that are both after S1 (in execution time) and that are prior to S* (in execution time) in the halted block B*, and the statements S3 are also elements in the MayDef(X*) set).

Control then continues to block 720 where the debugger 158 displays or presents the statements that are elements of the ResultDef(X*) set in the result definition presentation 215 via the terminal 121. The debugger 158 identifies, in the result definition presentation 215, those statements in ResultDef (X*) that are also in MustDef(X*) as statements that must have stored (the probability is equal to 1) a value to the contents at the storage location X* when the statements were executed. The debugger 158 identifies, in the result definition presentation 215, those statements in ResultDef(X*) that are also in MayDef(X*) and are not in MustDef(X*) as statements that might have stored (the probability is greater than zero and less than 1) a value to the contents of the storage location X* when the statements were executed. Control then continues to block 799 where the logic of FIG. 7 returns.

If the determination at block 710 is false, then a statement S1 does not exist prior to the halted statement S* in the halted block B* or the statement S1 is not an element of the MustDef (X*) set, so control continues to block 725 where the debugger 158 calculates the DefLoc(B,X*) set and the Mask(B,X*) set for each block B in the control flow graph 154. Control then continues to block 730 where the debugger 158 calculates the DefIn(B,X*) set and the DefOut(B,X*) set for each block B in the control flow graph, as further described below with reference to FIG. 9. Control then continues to block 735 where the debugger 158 calculates the statements that are elements of the ResultDef(X*) set, as further described below with reference to FIG. 10.

Control then continues to block 720 where the debugger 158 displays or presents the statements that are elements of the ResultDef(X*) set in the result definition presentation 215 via the terminal 121. The debugger 158 identifies, in the result definition presentation 215, those statements in ResultDef (X*) that are also in MustDef(X*) as statements that must have stored a value to the contents at the storage location X*. The debugger 158 identifies, in the result definition presentation 215, those statements in ResultDef(X*) that are also in MayDef(X*) as statements that might have stored (the probability is greater than zero) a value to the contents of the storage location X*. Control then continues to block 799 where the logic of FIG. 7 returns.

Figure 8:
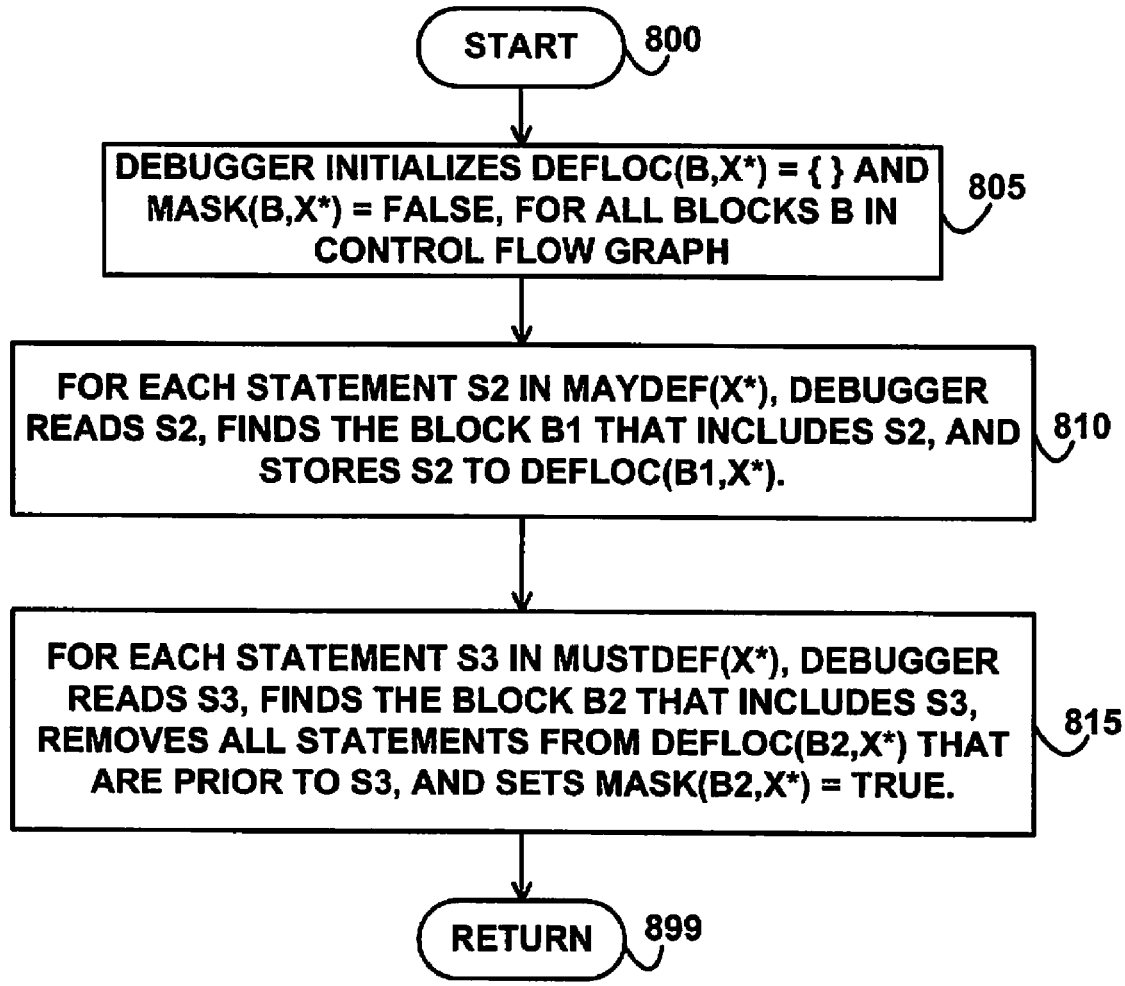
FIG. 8 depicts a flowchart of example processing for calculating DefLoc (Defined-locally) and Mask sets, according to an embodiment of the invention.

FIG. 8 depicts a flowchart of example processing for calculating the DefLoc(B,X*) and Mask(B,X*) sets, according to an embodiment of the invention. Control begins at block 800.

Control then continues to block 805 where the debugger 158 initializes DefLoc(B,X*) to be null (so that DefLoc(B, X*) has no elements) and initializes Mask(B,X*)=false, for each basic block B in the control flow graph 154.

Control then continues to block 810 where the debugger 158, for each statement S2 in MayDef(X*), reads the statement S2, finds the basic block B1 that includes the statement S2, and adds the statement S2 (or an identifier of the statement S2) to the set DefLoc(B1, X*).

Control then continues to block 815 where the debugger 158, for each statement S3 in MustDef(X*), reads the statement S3, finds the block B2 that includes the statement S3, removes all statements from DefLoc(B2,X*) that are prior (prior in execution time within the control flow) to the statement S3, and sets Mask(B2,X*)=true. For each statement S4 that is present in any block B4 in the program 150, but is not present in MustDef(X*), Mask(B4, X*) remains false because it was initialized to false, as previously described above with reference to block 805.

Control then continues to block 899 where the logic of FIG. 8 returns.

Figure 9:
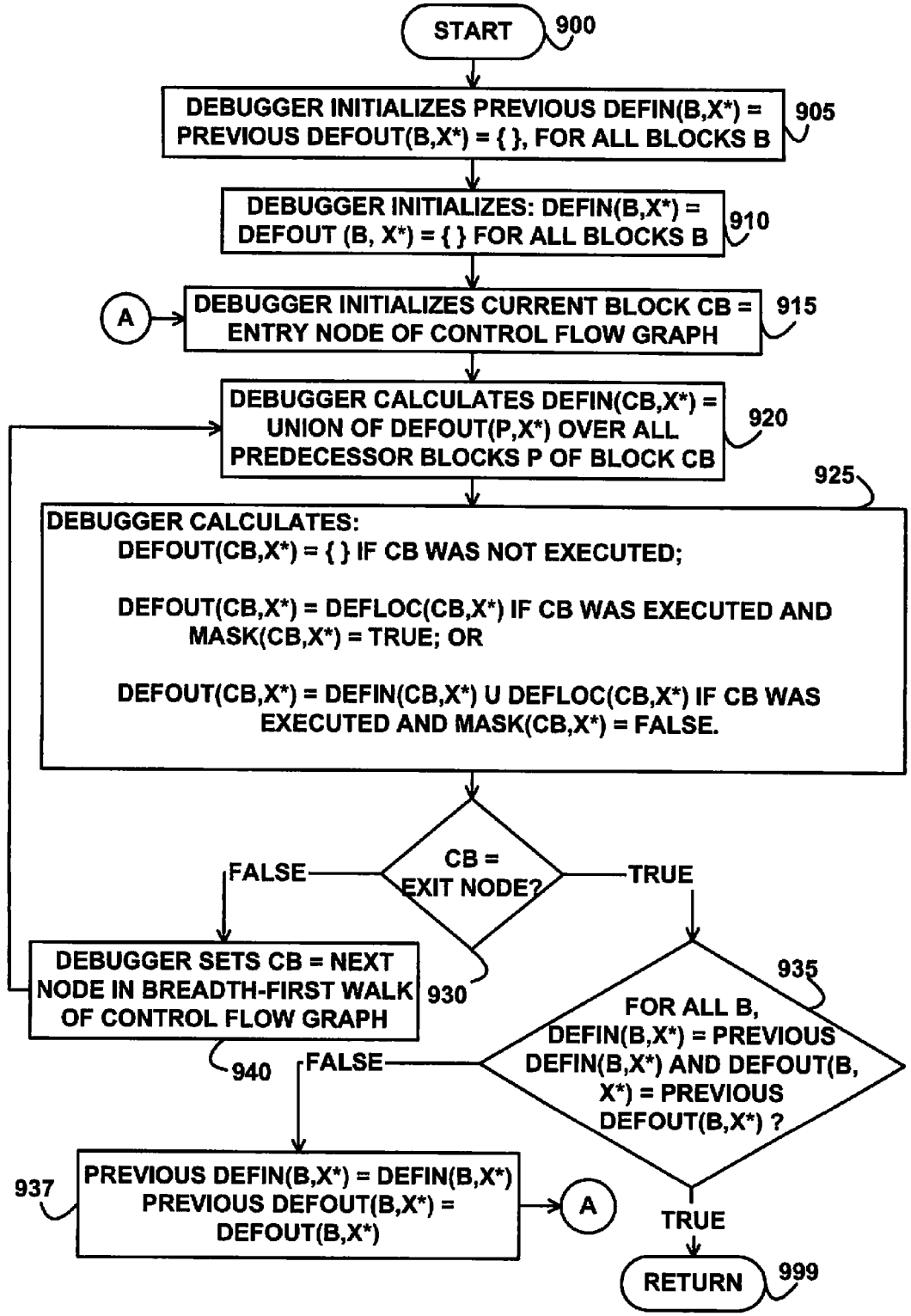
FIG. 9 depicts a flowchart of example processing for calculating DefIn (Definition-In) and DefOut (Definition-Out) sets, according to an embodiment of the invention.

FIG. 9 depicts a flowchart of example processing for calculating the DefIn and DefOut sets, according to an embodiment of the invention. Control begins at block 900.

Control then continues to block 905 where the debugger 158 initializes the previous DefIn(B,X*) sets for the storage location X* and the previous DefOut(B,X*) sets for the storage location X* to be null, for all blocks B in the control flow graph 154. A set that is null has no members (no statements).

Control then continues to block 910 where the debugger 158 initializes all DefIn(B,X*) sets and all DefOut(B,X*) sets to be null, for all blocks B in the control flow graph 154.

Control then continues to block 915 where the debugger 158 initializes the current block (CB) to be the entry node of the control flow graph 154. In the example of FIG. 3, the entry node is the block J 205-1. The debugger 158 pushes the current block CB into a FIFO (First In First Out) queue and starts a breadth-first walk of the control flow graph 154.

A breadth-first walk is a graph search algorithm that begins at the entry node of the control flow graph 154 and searches, reads, walks, explores, analyzes, or processes all the neighboring nodes in the control flow graph 154. Then, for each of those nearest nodes, the breadth-first walk algorithm explores their unexplored neighbor nodes, and so on, until the breadth-first walk algorithm reaches the exit node of the control flow graph 154. The breadth-first walk algorithm is an uninformed search algorithm, in that it examines all nodes of the graph systematically in the order specified by the breadth-first walk algorithm. That is, the breadth-first walk algorithm exhaustively searches or walks the entire control graph.

In general, the breadth-first walk algorithm is implemented as follows:

1. Push the entry node into a FIFO (First In First Out) queue. (If a LIFO or Last In First Out stack were used instead, the algorithm would be a depth-first walk). Step 1 is implemented via block 915.

2. Pull a node from the beginning of the queue and examine it. Step 2 is implemented via blocks 920 and 925.

3. Push all the (so-far-unexamined) successors (the direct child nodes) of this node into the end of the queue, if there are any. Step 3 is implemented via block 940.

4. If the queue is empty, every node on the graph has been examined, so stop the walk. Step 4 is implemented via the true leg of block 930.

5. If the queue is not empty, repeat the algorithm, starting from step 2. Step 5 is implemented via blocks 930 and 940, which returns to block 920.

Control then continues to block 920 where the debugger 158 pulls the current block CB from the queue and calculates DefIn(CB,X*)=union of DefOut(P,X*), over all predecessor blocks P of the current block CB.

Control then continues to block 925 where the debugger 158 sets:

DefOut(CB,X*)=null if the current block CB was not executed;

DefOut(CB,X*)=DefLoc(CB,X*) if the current block CB was executed and Mask(CB,X*)=true; or DefOut(CB,X*)=DefIn(CB,X*) UNION DefLoc(CB,X*) if the current block CB was executed and Mask(CB,X*)=false.

Control then continues to block 930 where the debugger 158 determines whether the current block (CB) is the exit node of the control flow graph 154 (the queue is empty). If the determination at block 930 is true, then the current block (CB) is the exit node of the control flow graph 154 and the queue is empty, so control continues to block 935 where the debugger 158 determines whether DefIn(B,X*)=previous DefIn(B,X*) and DefOut(B,X*)=previous DefOut(B,X*), for all basic blocks B in the control flow graph 154.

If the determination at block 935 is true, then DefIn(B,X*)=previous DefIn(B,X*) and DefOut(B,X*)=previous DefOut(B,X*), for all basic blocks B in the control flow graph 154, so a steady state for DefIn and DefOut has been reached; that is, the DefIn and DefOut sets DefOut did not change between the successive or consecutive passes or iterations of the breadth-first walks of the blocks, so no more passes or iterations of breadth-first walks of the blocks are needed, so control continues to block 999 where the logic of FIG. 9 returns. The number of passes or iterations of the breadth-first walks is bounded by (has a maximum of) the maximum loop depth of the program.

If the determination at block 935 is false, then DefIn(B,X*) does not equal the previous DefIn(B,X*) (created by the previous breadth-first walk) or DefOut(B,X*) does not equal the previous DefOut(B,X*) (created by the previous breadth-first walk), for at least one of the basic blocks B in the control flow graph 154, so control continues to block 937 where the debugger 158 sets the previous DefIn(B,X*)=DefIn(B,X*) and the previous DefOut(B,X*)=DefOut(B,X*), for all basic blocks B in the control flow graph 154.

Control then returns to block 915 where the debugger 158 initializes the current block to be the entry node of the control flow graph 154, the debugger 158 pushes the entry block into the queue, and the debugger 158 then repeats the breadth first walk of the flow control graph (performs another pass), as previously described above.

If the determination at block 930 is false, then the current block CB is not the exit node of the control flow graph 154 (the queue is not empty), so control continues to block 940 where the debugger 158 sets the current block CB to be the next node in the breadth-first walk of the control flow graph 154, e.g., the debugger 158 pulls the next node from the queue and sets the current block CB to be the next node.

Control then returns to block 920 where the debugger 158 calculates the DefIn(CB,X*)=union of DefOut(P,X*), where the union is performed over all predecessor blocks P of the current block CB. Control then continues to block 925, repeating the processing previously described above using the new current block (CB).

Figure 10:
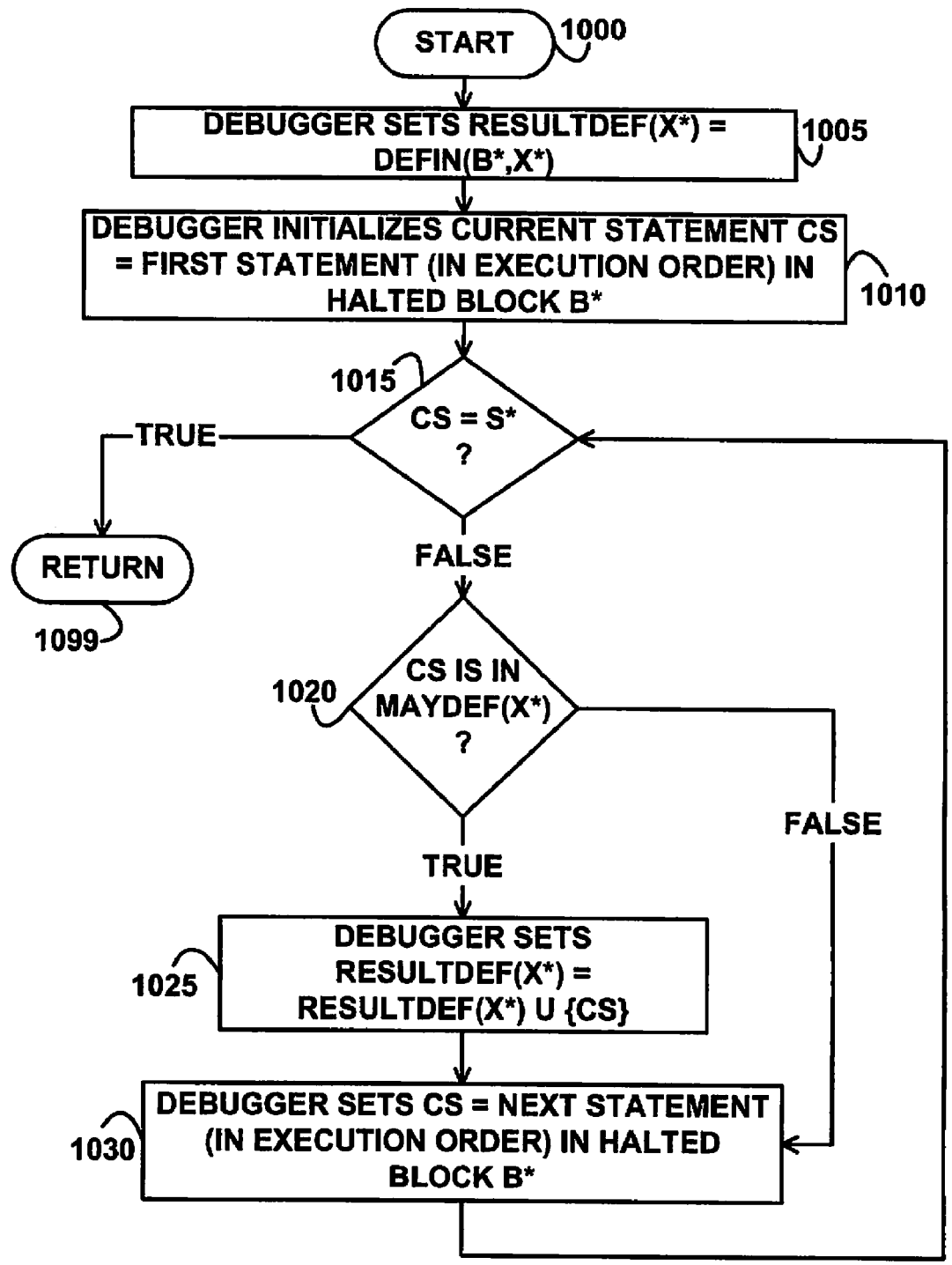
FIG. 10 depicts a flowchart of example processing for calculating a ResultDef (Result-Definition) set, according to an embodiment of the invention.

FIG. 10 depicts a flowchart of example processing for calculating a ResultDef set, according to an embodiment of the invention. Control begins at block 1000. Control then continues to block 1005 where the debugger 158 sets ResultDef(X*)=DefIn(B*,X*). Control then continues to block 1010 where the debugger 158 initializes the current statement CS=the first statement (in execution order with the control flow) in the halted block B*. Control then continues to block 1015 where the debugger 158 determines whether the current statement CS is equal to the halted statement S*. If the determination at block 1015 is true, then the current statement CS is the halted statement S*, so control continues to block 1099 where the logic of FIG. 10 returns.

If the determination at block 1015 is false, then the current statement CS is not the halted statement S*, so control continues to block 1020 where the debugger 158 determines whether the current statement CS is an element of MayDef(X*). If the determination at block 1020 is true, then the current statement CS is an element of MayDef(X*), so control continues to block 1025 where the debugger 158 sets ResultDef(X*)=ResultDef(X*) UNION the current statement CS.

Control then continues to block 1030 where the debugger 158 sets the current statement CS to be the next statement (in time execution order within the control flow) in the halted block B*. Control then returns to block 1015 where the loop of blocks 1015, 1020, 1025, and 1030 repeats until the determination at block 1015 is true.

If the determination at block 1020 is false, then the current statement CS is not an element of MayDef(X*), so control continues to block 1030 where the debugger 158 sets the current statement CS to be the next statement (in time execution order within the control flow) in the halted block B*. Control then returns to block 1015 where the loop of blocks 1015, 1020, 1025, and 1030 repeats until the determination at block 1015 is true.

Thus, the logic of FIG. 10 initializes ResultDef to be DefIn(B*, X*) and then walks (processes) the statements in the halted block B* in forward order until the halted statement S* is reached. If the walk of the halted block B* encounters a current statement CS that is in MayDef(X*), then ResultDef is changed to ResultDef(X*) U {CS}. The walk of the halted block B* performed by FIG. 10 does not encounter any statements in MustDef(X*) because the logic of FIG. 10 is not invoked from the true leg of block 710 of FIG. 7. Thus, the debugger calculates the result-definition set to be the union of the DefIn(B*,X*) set for the halted block B* and the statements in the halted block B* that were executed and are in the MayDef(X*) set.

Embodiments of the invention may be better understood by reference to the following example, which uses the example program listing 200 of FIG. 2, the example control flow graph 154 of FIG. 3, the sets 156 of FIG. 4, and the logic of FIGS. 5, 6, 7, 8, 9, and 10. The control flow graph 154 of FIG. 3 is the control flow graph of the program 150, with basic blocks labeled J through R. Execution of the program 150 is entered in block J 205-1, and exits at block R 205-9. Direct definitions of the variable V occur at statement "15" in block L 205-3, at statement "20" in block M 205-4, and at statement 40 in block P 205-7. An assignment through a pointer, which may or may not modify the variable V, occurs at statement "25" in block N 205-5. Therefore, in this example, the compiler 152 saves the following sets for the variable V, as part of the compilation process of the program source code 150-1 into the program object code 150-2:

MustDef(V)={15, 20, 40}; and

MayDef(V)={15, 20, 25, 40}.

During the execution of the program object code 150-2 during the current debugging session, execution of the program 150 was entered at block J 205-1, and then blocks K 205-2, L 205-3, N 205-5, O 205-6, and Q 205-8 were executed. The control flow of the execution then took the back arc 305-9 from block Q 205-8 to block O 205-6, and the user halted execution at statement "30" in block O 205-6 or execution of the program 150 encountered a breakpoint at statement "30" in block O 205-6, which halted the program 150. At this time, the user issued the find source definition command 210 to the debugger 158, which requested the debugger 158 to find the statement in the program 150 that is the source of the definition of the value of the variable V.

In response to the source definition command 210, the debugger 158 determines whether there exists a statement in block O 205-6 prior to statement "30" that is in the MustDef (V) set. Such a statement does not exist, so the debugger 158 calculates that all DefLoc(B,V) sets are empty except for:

DefLoc(L,V)={15} (because the statement "15" is in MayDef(V), and block L 205-3 does not contain a statement after statement 15 that is in MustDef(V));

DefLoc(M,V)={20}(because the statement "20" is in MayDef(V), and block M 205-4 does not contain a statement after statement "20" that is in MustDef(V) since statement "21," which is later than statement "20" in the control flow of block M 205-4 is not in MustDef(V));

DefLoc(N,V)={25}(because statement "25" is in MayDef (V), and block N 205-5 does not contain a statement after statement "25" that is in MustDef(V)); and DefLoc(P,V)={40}(because statement "40" is in MayDef (V), and block P 205-7 does not contain a statement after statement "40" that is in MustDef(V)).

Also, the debugger 158 sets all Mask(B,V) values to false, for all blocks B in the program 150, except:

Mask(L,V) true (because the block L 205-3 contains the statement "15," which is in MustDef(V));

Mask(M,V) true (because the block M 205-4 contains the statement "20," which is in MustDef(V); and Mask(P,V)=true (because the block P 205-7 contains the statement "40," which is in MustDef(V).

The debugger 158 then performs a first walk of the control flow graph 154, calculating the initial DefIn(B,V) and DefOut (B,V) sets, for all blocks B in the program 150, as follows:

DefIn(J,V) { } (because the block J 205-1 is the entry block, so block J 205-1 has no predecessor blocks);

DefOut(J,V)={ } (because the block J 205-1 was executed, Mask(J,V)=false, DefLoc(J,V)={ }, and DefIn(J,V)={ };

DefIn(K,V)={ } (because the block J 205-1 is the predecessor block to block K 205-2 and DefOut(J,V)={ });

DefOut(K,V)={ } (because the block K 205-2 was executed, Mask(K,V)=false, DefLoc(K,V)={ }, and DefIn (K,V)={ });

DefIn(L,V)={ } (because the block K 205-2 is the predecessor block to block L 205-3 and DefOut(K,V)={ });

DefOut(L,V)={ 15} (because the block L 205-3 was executed, Mask(L,V)=true, and statement "15" is in DefLoc (L,V));

DefIn(M,V)={ } (because the block K 205-2 is the predecessor block to block M 205-4, and DefOut(K,V)={ });

DefOut(M,V)={ } (because the block M 205-4 was not executed);

DefIn(N,V)={15} (because the blocks L 205-3 and M 205-4 are the predecessor blocks to block N 205-5, and DefOut(L,V) U DefOut(M,V)={15});

DefOut(N,V)={15, 25} (because the block N 205-5 was executed, Mask(N,V)=false, and DefIn(N,V) U DefLoc(N, V)={15, 25};

DefIn(O,V)={15, 25} (because the blocks N 205-5 and Q 205-8 are the predecessor blocks to block O 205-6, and DefOut(N,V) U DefOut(Q,V)={15, 25});

DefOut(O,V)={15, 25} (because the block O 205-6 was executed, Mask(O,V)=false, and DefIn(O,V) U DefLoc(O, V)={15, 25};

DefIn(P,V)={15, 25} (because the block O 205-6 is the predecessor block to the block P 205-7, and DefOut(O, V)={15, 25});

DefOut(P,V)={ } (because the block P 205-7 was not executed);

DefIn(Q,V)={15, 25} (because blocks O 205-6 and P 205-7 are the predecessor blocks to the block Q 205-8, and DefOut(O,V) U DefOut(P,V)={15, 25});

DefOut(Q,V)={15, 25} (because the block Q 205-8 was executed, Mask(Q,V) false, and DefIn(Q,V) U DefLoc (Q,V)={15, 25};

DefIn(R,V)={15, 25} (because blockQ 205-8 is the predecessor block to block R 205-9, and DefOut(Q,V)={15, 25}); and DefOut(R,V) { } (because the block R 205-9 was not executed).

The debugger 158 then performs a second walk over the control flow graph 154, which does not result in any changes to the sets as compared to the sets produced by the previous walk, so the sets have reached a steady state and the debugger performs no more walks of the control flow graph 154.

The debugger 158 then calculates ResultDef(V)=DefIn(O, V)={15, 25}. No intervening definitions that might change V exist between the start of halted block O 205-6 and the halted statement "30," so the debugger 158 presents {15, 25} in the presentation 215 and indicates that statement "15" must define the contents of the storage location V (since the statement "15" in ResultDef(V) is also in MustDef(V)) and that statement "25" might define the contents of the storage location V (since the statement "15" in ResultDef(V) is also in MayDef(V) but is not in MustDef(V)). The debugger 158 omits the definitions of V that occur in blocks M 205-4 and P 205-7 because those blocks are unexecuted.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
receiving an identifier of a storage location, wherein the storage location is accessed by execution of a program, wherein the program comprises a plurality of statements divided into a plurality of blocks;
in response to the receiving the identifier of the storage location, determining a first source statement in the program that must have written to the storage location and a second source statement in the program that might have written to the storage location, wherein the determining is performed while the execution of the program is halted at a halted statement in a halted block, and wherein the first source statement and the second source statement are different than the halted statement;
presenting a first identifier of the first source statement, an indication that the first source statement must have written to the storage location, a second identifier of the second source statement, and an indication that the second source statement might have written to the storage location, in response to the determining;
reading a must-define set and a may-define set for the storage location, wherein the must-define set and the may-define set were created by a compiler that compiled the program, wherein the may-define set comprises a first plurality of identifiers of the statements in the program that the compiler calculated have a probability of writing to the storage location of greater than zero, and wherein the must-define set comprises a second plurality of identifiers of the statements in the program that the compiler calculated have a probability of writing to the storage location of equal to one; and
wherein the determining further comprises for each block in a control flow graph that represents all paths through the plurality of blocks that are possible for the execution of the program to traverse, calculating a defined-locally set for the block, wherein the calculating the defined-locally set further comprises adding to the defined-locally set for the block the identifiers of the statements that are in the block, are also in the may-define set, and no later statement in the block is in the must-define set, and for each block in the control flow graph, calculating a mask for the block, wherein the calculating the mask for the block further comprises setting the mask for the block to be true if the block contains a statement that is in the must-define set and setting the mask for the block to be false if the block does not contain any of the identifiers of the statements that are in the must-define set.

2. The method of claim 1, wherein the determining further comprises:
for each block in the control flow graph, initializing a definition-in set for the block to be a null set and initializing a definition-out set for the block to be the null set;
processing each block in the control flow graph in an order specified by a breadth-first walk of the control flow graph, wherein the processing further comprises
for each block in the control flow graph, setting the definition-in set for the block to be the union of the definition-out sets for all predecessors of the block, and
for each block in the control flow graph, setting the definition-out set for the block to be the null set if the block was not executed, setting the definition-out set for the block to be the defined-locally set for the block if the block was executed and the mask for the block is true, setting the definition-out set for the block to be the union of the definition-in set for the block and the defined-locally set for the block if the block was executed and the mask for the block is false; and
repeating the processing until the definition-in set and the definition-out set do not change between iterations of the processing.

3. The method of claim 2, wherein the determining further comprises:
if the first source statement, that is in the must-define set is prior to the halted statement in the halted block, calculating a result-definition set to be a union of the first source statement and the statements that are in the may-define state that are after the first source statement in the halted block and before the halted statement in the halted block; and
if the first source statement that is in the must-define set is not prior to the halted statement in the halted block, calculating a result-definition set to be a union of the definition-in set for the halted block and the identifiers of the statements in the halted block that were executed and that are in the may-define set.

4. The method of claim 3, wherein the determining further comprises:
identifying in the result-definition set the first source statement that is in the must-define set.

5. The method of claim 4, wherein the determining further comprises:
identifying in the result-definition set the second source statement that is in the may-define set and is not in the must-define set.

6. A non-transitory storage medium encoded with instructions, wherein the instructions when executed comprise:
receiving an identifier of a storage location, wherein the storage location is accessed by execution of a program, wherein the program comprises a plurality of statements divided into a plurality of blocks;
in response to the receiving the identifier of the storage location, determining a first source statement in the program that must have written to the storage location and a second source statement in the program that might have written to the storage location, wherein the determining is performed while the execution of the program is halted at a halted statement in a halted block, and wherein the first source statement and the second source statement are different than the halted statement;
presenting a first identifier of the first source statement, an indication that the first source statement must have written to the storage location, a second identifier of the second source statement, and an indication that the second source statement might have written to the storage location, in response to the determining;

reading a must-define set and a may-define set for the storage location, wherein the must-define set and the may-define set were created by a compiler that compiled the program, wherein the may-define set comprises a first plurality of identifiers of the statements in the program that the compiler calculated have a probability of writing to the storage location of greater than zero, and wherein the must-define set comprises a second plurality of identifiers of the statements in the program that the compiler calculated have a probability of writing to the storage location of equal to one and wherein the determining further comprises for each block in a control flow graph that represents all paths through the plurality of blocks that are possible for the execution of the program to traverse, calculating a defined-locally set for the block, wherein the calculating the defined-locally set further comprises adding to the defined-locally set for the block the identifiers of the statements that are in the block, are also in the may-define set, and no later statement in the block is in the must-define set, and for each block in the control flow graph, calculating a mask for the block, wherein the calculating the mask for the block further comprises setting the mask for the block to be true if the block contains a statement that is in the must-define set and setting the mask for the block to be false if the block does not contain any of the identifiers of the statements that are in the must-define set.

7. The non-transitory storage medium of claim 6, wherein the determining further comprises:

for each block in the control flow graph, initializing a definition-in set for the block to be a null set and initializing a definition-out set for the block to be the null set;

processing each block in the control flow graph in an order specified by a breadth-first walk of the control flow graph, wherein the processing further comprises for each block in the control flow graph, setting the definition-in set for the block to be the union of the definition-out sets for all predecessors of the block, and for each block in the control flow graph, setting the definition-out set for the block to be the null set if the block was not executed, setting the definition-out set for the block to be the defined-locally set for the block if the block was executed and the mask for the block is true, setting the definition-out set for the block to be the union of the definition-in set for the block and the defined-locally set for the block if the block was executed and the mask for the block is false; and repeating the processing until the definition-in set and the definition-out set do not change between iterations of the processing.

8. The non-transitory storage medium of claim 7, wherein the determining further comprises:

if the first source statement that is in the must-define set is prior to the halted statement in the halted block, calculating a result-definition set to be a union of the first source statement and the statements that are in the may-define state that are after the first source statement in the halted block and before the halted statement in the halted block; and if the first source statement that is in the must-define set is not prior to the halted statement in the halted block, calculating a result-definition set to be a union of the definition-in set for the halted block and the identifiers of the statements in the halted block that were executed and that are in the may-define set.

9. The non-transitory storage medium of claim 8, wherein the determining further comprises:

identifying in the result-definition set the first source statement that is in the must-define set.

10. The non-transitory storage medium of claim 9, wherein the determining further comprises:

identifying in the result-definition set the second source statement that is in the may-define set and is not in the must-define set.

11. A computer system comprising:

a processor; and memory communicatively connected to the processor, wherein the memory is encoded with instructions, wherein the instructions when executed on the processor comprise:

receiving an identifier of a storage location, wherein the storage location is accessed by execution of a program, wherein the program comprises a plurality of statements divided into a plurality of blocks, reading a must-define set and a may-define set for the storage location, wherein the must-define set and the may-define set were created by a compiler that compiled the program, wherein the may-define set comprises a first plurality of identifiers of the statements in the program that the compiler calculated have a probability of writing to the storage location of greater than zero, and wherein the must-define set comprises a second plurality of identifiers of the statements in the program that the compiler calculated have a probability of writing to the storage location of equal to one, in response to the receiving the identifier of the storage location, determining a first source statement in the program that must have written to the storage location and a second source statement in the program that might have written to the storage location, wherein the determining is performed while the execution of the program is halted at a halted statement in a halted block, and wherein the first source statement and the second source statement are different than the halted statement, presenting a first identifier of the first source statement, an indication that the first source statement must have written to the storage location, a second identifier of the second source statement, and an indication that the second source statement might have written to the storage location, in response to the determining, and wherein the determining further comprises for each block in a control flow graph that represents all paths through the plurality of blocks that are possible for the execution of the program to traverse, calculating a defined-locally set for the block, wherein the calculating the defined-locally set further comprises adding to the defined-locally set for the block the identifiers of the statements that are in the block, are also in the may-define set, and no later statement in the block is in the must-define set, and for each block in the control flow graph, calculating a mask for the block, wherein the calculating the mask for the block further comprises setting the mask for the block to be true if the block contains a statement that is in the must-define set and setting the mask for the block to be false if the block does not contain any of the identifiers of the statements that are in the must-define set.

12. The computer system of claim 11, wherein the determining further comprises:

for each block in the control flow graph, initializing a definition-in set for the block to be a null set and initializing a definition-out set for the block to be the null set;

processing each block in the control flow graph in an order specified by a breadth-first walk of the control flow graph, wherein the processing further comprises for each block in the control flow graph, setting the definition-in set for the block to be the union of the definition-out sets for all predecessors of the block, and for each block in the control flow graph, setting the definition-out set for the block to be the null set if the block was not executed, setting the definition-out set for the block to be the defined-locally set for the block if the block was executed and the mask for the block is true, setting the definition-out set for the block to be the union of the definition-in set for the block and the defined-locally set for the block if the block was executed and the mask for the block is false; and repeating the processing until the definition-in set and the definition-out set do not change between iterations of the processing.

13. The computer system of claim 12, wherein the determining further comprises:

if the first source statement that is in the must-define set is prior to the halted statement in the halted block, calculating a result-definition set to be a union of the first source statement and the statements that are in the may-define state that are after the first source statement in the halted block and before the halted statement in the halted block; and if the first source statement that is in the must-define set is not prior to the halted statement in the halted block, calculating a result-definition set to be a union of the definition-in set for the halted block and the identifiers of the statements in the halted block that were executed and that are in the may-define set.

14. The computer system of claim 13, wherein the determining further comprises:

identifying in the result-definition set the first source statement that is in the must-define set.

15. The computer system of claim 14, wherein the determining further comprises:

identifying in the result-definition set the second source statement that is in the may-define set and is not in the must-define set.

* * * * *